(12) United States Patent
Ha et al.

(10) Patent No.: US 11,288,986 B2
(45) Date of Patent: *Mar. 29, 2022

(54) FILM FOR DISPLAY DEVICE, DISPLAY DEVICE INCLUDING THE SAME, AND MANUFACTURING METHOD THEREOF

(71) Applicant: Samsung Display Co., Ltd., Yongin-si (KR)

(72) Inventors: Seung-Hwa Ha, Hwaseong-si (KR); Jung Hun Lee, Hwaseong-si (KR); Kyu Young Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,208

(22) Filed: Dec. 3, 2018

(65) Prior Publication Data

US 2019/0213924 A1   Jul. 11, 2019

(30) Foreign Application Priority Data

Jan. 9, 2018   (KR) ................. 10-2018-0002958

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC ... G09F 9/301; G06F 1/1652; H01L 51/5253; H01L 51/0097; H01L 51/56; H01L 27/3276

USPC ......................................................... 428/98
See application file for complete search history.

(56) References Cited

U.S. PATENT DOCUMENTS

| 9,274,559 | B2 | 3/2016 | Prushinskiy et al. |
| 10,007,132 | B2 | 6/2018 | Yoon et al. |
| 10,170,505 | B2 | 1/2019 | Lee et al. |
| 10,270,059 | B2 | 4/2019 | Kim |
| 10,396,304 | B2 | 8/2019 | Watabe et al. |
| 2008/0284971 | A1* | 11/2008 | Park ............ G02F 1/133305 349/158 |
| 2014/0029212 | A1* | 1/2014 | Hwang ............ G09F 9/301 361/749 |

(Continued)

FOREIGN PATENT DOCUMENTS

| CN | 106486520 | 3/2017 |
| CN | 106652802 | 5/2017 |

(Continued)

OTHER PUBLICATIONS

Machine_English_translation_JP_2002110349_A; Manufacturing Method of Organic Electroluminescent Display; Apr. 12, 2002; EPO; whole document (Year: 2002).*

(Continued)

*Primary Examiner* — Tahseen Khan
(74) *Attorney, Agent, or Firm* — H.C. Park & Associates, PLC

(57) ABSTRACT

A support film for a display device to support a display panel of the display device including a first region having a first thickness and a second region having a second thickness less than the first thickness, a groove formed in the second region, and a reinforcing layer formed in the groove.

20 Claims, 19 Drawing Sheets

(56) References Cited

U.S. PATENT DOCUMENTS

| | | | |
|---|---|---|---|
| 2014/0140036 A1* | 5/2014 | Kim | G06F 3/041 |
| | | | 362/19 |
| 2015/0102296 A1 | 4/2015 | Kim et al. | |
| 2016/0204183 A1 | 7/2016 | Tao et al. | |
| 2017/0045914 A1* | 2/2017 | Namkung | G02F 1/133305 |
| 2017/0062760 A1* | 3/2017 | Kim | H01L 51/5253 |
| 2017/0121977 A1 | 5/2017 | Augustyniak | |
| 2017/0263887 A1 | 9/2017 | Han et al. | |
| 2017/0263890 A1 | 9/2017 | Chun | |
| 2017/0331073 A1* | 11/2017 | Choi | H01L 51/0096 |
| 2018/0337225 A1* | 11/2018 | Han | H01L 27/1244 |
| 2019/0214597 A1* | 7/2019 | Li | H01L 51/5246 |

FOREIGN PATENT DOCUMENTS

| | | | |
|---|---|---|---|
| CN | 107425016 | | 12/2017 |
| CN | 107464800 | | 12/2017 |
| JP | 2002110349 A | * | 4/2002 |
| KR | 10-2013-0076402 | | 7/2013 |
| KR | 10-2015-0020895 | | 2/2015 |
| KR | 10-2016-0054125 | | 5/2016 |
| KR | 10-2017-0106558 | | 9/2017 |
| KR | 10-2017-0106590 | | 9/2017 |

OTHER PUBLICATIONS

Final Office Action dated Jul. 13, 2020, in co-pending U.S. Appl. No. 16/248,655.
Chinese Office Action dated Oct. 25, 2021, in Chinese Patent Office for Chinese Patent Application No. 201910019784.5 (with English Concise Explanation).

* cited by examiner

FILM FOR DISPLAY DEVICE, DISPLAY DEVICE INCLUDING THE SAME, AND MANUFACTURING METHOD THEREOF

CROSS-REFERENCE TO RELATED APPLICATION

This application claims priority from and the benefit of Korean Patent Application No. 10-2018-0002958, filed on Jan. 9, 2018, which is hereby incorporated by reference for all purposes as if fully set forth herein.

BACKGROUND

Field

Exemplary embodiments of the invention relate generally to a film for a display device, a display device including the same, and a manufacturing method thereof, and, more specifically, to a film for a display device that is bendable, a display device including the same, and a manufacturing method thereof.

Discussion of the Background

A flat panel display generally includes a liquid crystal display (LCD), a plasma display panel (PDP) device, an organic light emitting diode (OLED) device, a field effect display (FED), an electrophoretic display device, etc.

Recently, a display device has been developed to have flexibility so as to be bent or folded. In order to ensure reliability of a flexible display device, the flexible display device should be easily bendable, and a bending region of a display panel should be firmly supported to prevent damage in the bending region of the display panel.

The above information disclosed in this Background section is only for understanding of the background of the inventive concepts, and, therefore, it may contain information that does not constitute prior art.

SUMMARY

Display devices constructed according to exemplary embodiments of the invention are capable of being easily bent by including a film, which may also prevent damages to a bending region of a display panel by providing a support to the bending region.

Additional features of the inventive concepts will be set forth in the description which follows, and in part will be apparent from the description, or may be learned by practice of the inventive concepts.

A support film for a display device to support a display panel of the display device according to an exemplary embodiment includes a first region having a first thickness and a second region having a second thickness less than the first thickness, a groove formed in the second region, and a reinforcing layer formed in the groove.

Surface of the support film and the reinforcing layer may be substantially flat.

The support film may include a plastic or metal material, and the reinforcing layer may include a polymer or metal material.

A plurality of the grooves may be formed in the second region, and the reinforcing layer may be disposed in each of the grooves.

The second thickness may be about ½ to ⅔ of the first thickness.

The groove and the reinforcing layer may be disposed on at least one of both surfaces of the support film.

The groove may have a bottom surface and a lateral surface connected to the bottom surface, and an angle between the bottom surface and the lateral surface may be an obtuse angle.

The groove may have a bottom surface and a lateral surface connected to the bottom surface, and an angle between the bottom surface and the lateral surface may be an acute angle.

A display device according to an exemplary embodiment includes a display panel having a bending region, and a support film overlapping the display panel, in which the support film includes a first region having a first thickness and a second region having a second thickness less than the first thickness, the second region overlaps the bending region, the support film has a groove formed in the second region, and a reinforcing layer disposed in the groove.

Surfaces of the support film and the reinforcing layer may substantially flat.

The support film may include a plastic or metal material, and the reinforcing layer may include a polymer or metal material.

A plurality of the grooves may be formed in the second region, and the reinforcing layer may be disposed in each of the grooves.

A width of the second region may be greater than a width of the bending region.

The second thickness may be about ½ to ⅔ of the first thickness.

The groove and the reinforcing layer may be disposed on at least one of both surfaces of the support film.

The second region may have a middle portion and side portions interposing the middle portion, and a number of the grooves formed in the middle portion may be greater than a number of the grooves formed in one of the side portions.

The second region may have a middle portion and side portions interposing the middle portion, and a number of the grooves formed in each portion may be substantially the same with each other.

A manufacturing method of a display device according to an exemplary embodiment includes the steps of: forming a groove in a first region of a support film; forming a reinforcing layer in the groove; and attaching the support film to a display panel, in which the first region of the support film has a thickness less than remaining areas of the support film not disposed with the groove.

The groove may be formed by a pressing process using a roller.

The groove may be formed by etching the support film.

The reinforcing layer may be formed by stacking polymer or metal materials.

Forming the reinforcing layer may be performed by plating a metal material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
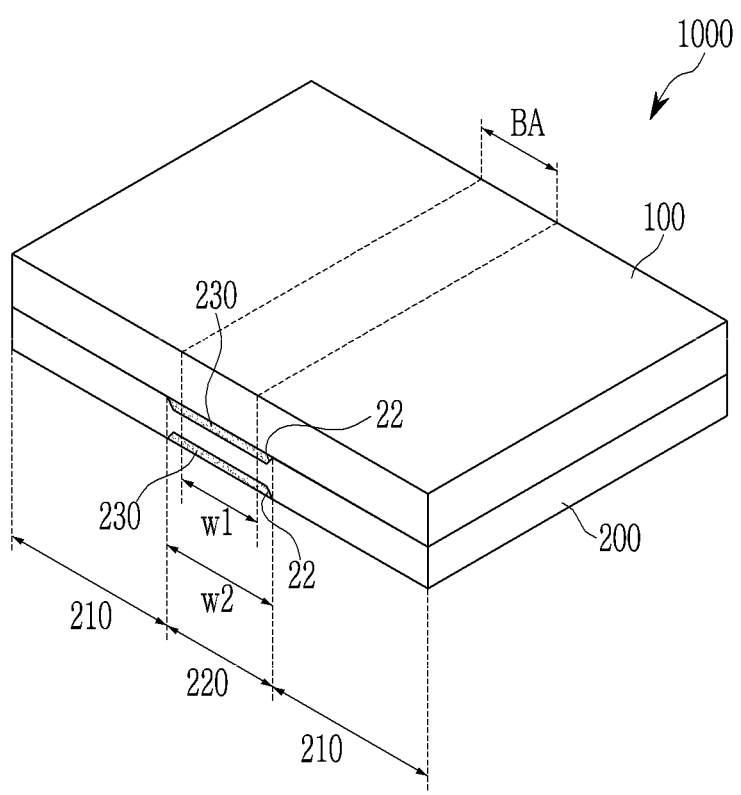
FIG. 1 is a perspective view of a display device according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
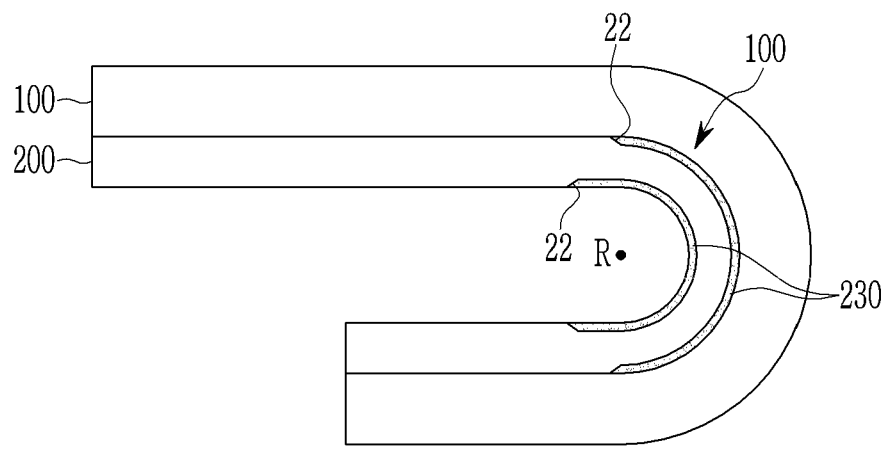
FIG. 2 is a cross-sectional view illustrating a state of which the display device of FIG. 1 is bent.

A display device according to an exemplary embodiment will be described with reference to FIG. 1 and FIG. 2. FIG. 1 is a perspective view of a display device according to an exemplary embodiment, and FIG. 2 is a cross-sectional view illustrating a state of which the display device of FIG. 1 is bent.

Referring to FIG. 1, a display device 1000 according to an exemplary embodiment includes a display panel 100 and a support film 200 for supporting the display panel 100.

The display device 1000 includes a bending region BA. The display panel 100 and the support film 200 may be bent in the bending region BA. FIG. 1 shows that the display device 1000 includes one bending region, but the inventive concepts are not limited thereto, and the display device may include a plurality of bending regions.

The support film 200 is disposed under the display panel 100 to support the display panel 100. An additional layer, such as an adhesive layer, may be disposed between the support film 200 and the display panel 100. In addition, another additional layer, such as a window, may be disposed on the display panel 100.

The support film 200 includes a first region 210 and a second region 220. The first region 210 may have a greater thickness than the second region 220 due to a first groove 22 formed in the second region 220. As used herein, a thickness is measured in a vertical direction with respect to a bottom surface thereof. A first reinforcing layer 230 is disposed in the first groove 22.

The first groove 22 and the reinforcing layer 230 of the support film 200 overlap the bending region BA of the display device 1000. A second width W2 of the second region 220, in which the first reinforcing layer 230 of the support film 200 is formed, is greater than a first width W1 of the bending region BA of the display device 1000. Since the second width W2 of the second region 220 is greater than the first width W1 of the bending region BA of the display device 1000, the bending process in the bending region BA may be easily performed.

The support film 200 may be a plastic or a thin metal film, and the first reinforcing layer 230 may be a polymer or a metal thin film. A thickness of the first region 210 of the support film 200 may be about 50 μm or less.

Since the support film 200 includes the second region 220, which is disposed at a position overlapping the bending region BA, and has a relatively thin thickness, the support film 200 corresponding to the bending region BA has a thin thickness. Accordingly, it is possible to reduce the stress applied to the support film 200 when bent. Accordingly, the support film 200 may be bent in the bending region BA. In addition, as the support film 200 includes the first reinforcing layer 230 formed in the second region 220 to protect the support film 200, it is possible to prevent the support film 200 from being damaged when the support film 200 is bent.

Referring to FIG. 2, the display device 1000 is bent to have a center R of a curvature radius closer to the support film 200 than the display panel 100. The support film 200 includes the first reinforcing layer 230 overlapping the bending region BA, and the first reinforcing layer 230 is formed at both sides of the support film 200.

Accordingly, since the first groove 22 and the first reinforcing layer 230 are formed in the second region 220 of the support film 200 overlapping the bending region BA, the second region 220 in the support film 200 corresponding to the bending region BA may have a relatively small thickness, which may cause the second region 220 to be easily bent. In addition, since the first reinforcing layer 230 is disposed in the second region 220 having a small thickness to protect the second region 220 of the support film 200, it is possible to prevent the support film 200 from being damaged when bent, as well as firmly supporting the display panel 100.

Figure 3:
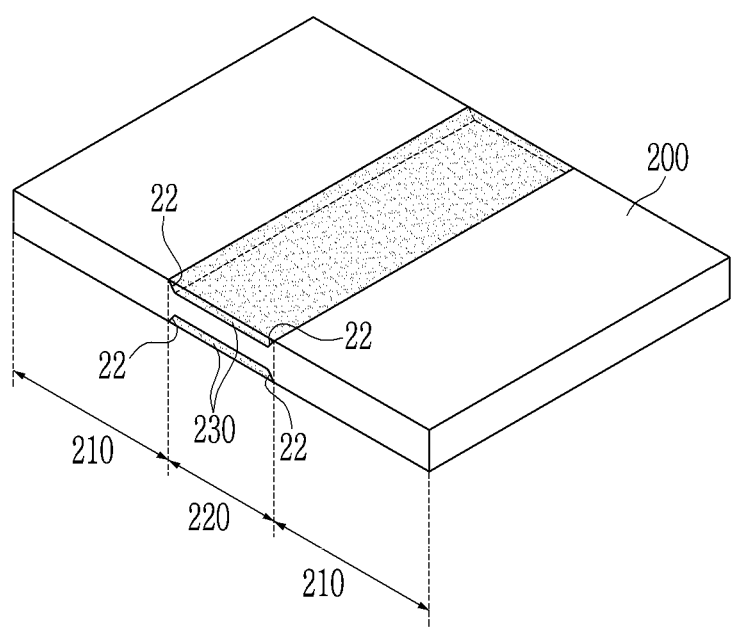
FIG. 3 is a perspective view of a support film of the display device of FIG. 1.

Hereinafter, a support film of a display device according to an exemplary embodiment will be described in detail with reference to FIG. 3 and FIG. 4. FIG. 3 is a perspective view of a support film of the display device of FIG. 1, and FIG. 4 is a cross-sectional view of a support film of the display device of FIG. 1.

Figure 4:
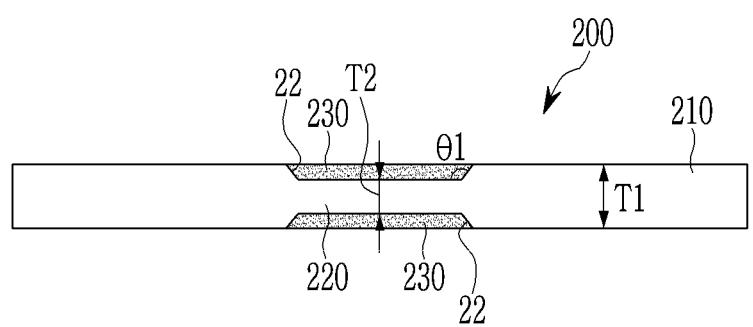
FIG. 4 is a cross-sectional view of a support film of the display device of FIG. 1 according to an exemplary embodiment.

Referring to FIG. 3 and FIG. 4, the support film 200 includes the first region 210 having a first thickness T1 and the second region 220 having a relatively small second thickness T2. The second thickness T2 may be about ½ to about ⅔ of the first thickness T1. As the second thickness T2 of the second region 220 is small, the stress applied to the support film 200 is decreased, thereby causing a bending process performed easily when bent. However, when the second thickness T2 of the second region 220 of the support film 200 is too small, the support film 200 may be easily damaged in the bending region BA. As such, the second thickness T2 of the second region 220 of the support film 200 may be about ½ to about ⅔ of the first thickness T1 of the support film 200, such that the bending process in the bending region may be easily performed while preventing damage to the support film 200.

The first groove 22 is formed in the second region 220. The second thickness T2 of the second region 220 is less than the first thickness T1 of the first region 210, in which a groove is not formed, due to the first groove 22 formed in the second region 220.

The first groove 22 is formed on an entire surface of the second region 220 of the support film 200. The first groove 22 has a bottom surface and a lateral surface forming a first angle θ1 with respect to the bottom surface, and the first angle θ1 may form an obtuse angle. For example, the first angle θ1 may be about 135 degrees or more. Since the first angle θ1 is an obtuse angle, the first groove 22 has substantially a trapezoidal shape, in which its width increases from the bottom surface towards a top surface thereof.

The first reinforcing layer 230 is disposed in the first groove 22. According to the illustrated exemplary embodiment shown in FIG. 4, the first reinforcing layer 230 is formed to fill the first groove 22, thus surfaces of the support film 200 and the first reinforcing layer 230 may be flat. More specifically the surface of the support film 200 and the surface of the first reinforcing layer 230 have substantially same heights with each other so the surface of the support film 200 and the surface of the first reinforcing layer 230 have no step difference. As such, since the surface of the support film 200 and the surface of the reinforcing layer 230 formed in the groove 22 of the support film 200 have substantially same heights with each other and the surface of the support film 200 and the surface of the first reinforcing layer 230 have no step difference, a step that is induced by the difference between the support film 200 and the first reinforcing layer 230 may not be visually recognized from the outside.

The first groove 22 and the first reinforcing layer 230 are disposed at both surfaces of the support film 200. The support film 200 may be a plastic or a thin metal film, and the first reinforcing layer 230 may be a polymer or a metal thin film. The first reinforcing layer 230 may include a metal layer different from that of the support film 200. The first reinforcing layer 230 may be formed by coating or plating a polymer or metal.

As described above with reference to FIG. 1, the second width W2 of the second region 220, in which the first reinforcing layer 230 is formed, is greater than the first width W1 of the bending region BA of the display device 1000. In this manner, the bending process may be easily performed in the bending region BA.

As such, in the display device and the support film according to an exemplary embodiment, since the groove is formed in the second region 220 of the support film 200 overlapping the bending region BA of the display device to reduce the thickness of the support film 200, the reduced stress applied to the support film 200 may cause the support film 200 to be easily bent. Furthermore, by forming the reinforcing layer in the groove to protect the support film 200, the support film 200 may be prevented from being damaged when bent, and the support film 200 may firmly support the display panel.

Figure 5:
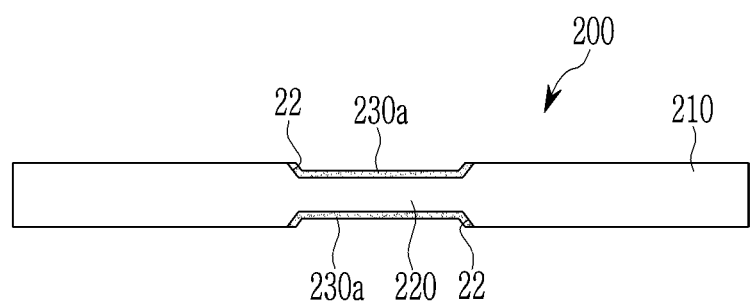
FIG. 5 is a cross-sectional view of a support film of the display device of FIG. 1 according to another exemplary embodiment.

Hereinafter, a support film of a display device according to another exemplary embodiment will be described with reference to FIG. 5. FIG. 5 is a cross-sectional view of a support film of the display device of FIG. 1 according to another exemplary embodiment.

Referring to FIG. 5, similarly to the exemplary embodiment described above, the support film 200 of the display device according to the illustrated exemplary embodiment includes the first groove 22 overlapping the bending region BA of the display device, and has a wider width than the bending region BA. A second reinforcing layer 230a is disposed in the first groove 22.

A thickness of the second reinforcing layer 230a is less than a height (or depth) of the first groove 22. The second reinforcing layer 230a may be formed by plating a metal layer.

As such, in the display device and the support film according to the illustrated exemplary embodiment, since the groove 22 is formed in the second region 220 of the support film 200 overlapping the bending region BA of the display device to reduce the thickness of the support film 200, the reduced stress applied to the support film 200 may cause the support film 200 to be easily bent. Furthermore, by forming the reinforcing layer 230a in the groove 22 to protect the support film 200, the support film 200 may be prevented from being damaged when bent, and the support film 200 may firmly support the display panel.

Most of the features of the support film 200 of the display device described above with reference to FIG. 1 to FIG. 4 are applicable to the support film 200 according to the illustrated exemplary embodiment.

Figure 6:
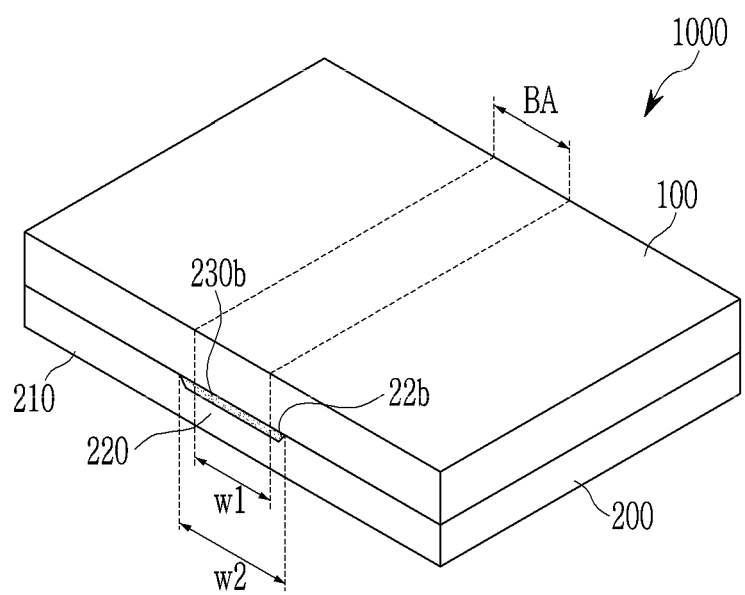
FIG. 6 is a perspective view of a display device according to another exemplary embodiment.

Hereinafter, a display device according to another exemplary embodiment will be described with reference to FIG. 6 and FIG. 7. FIG. 6 is a perspective view of a display device according to another exemplary embodiment, and FIG. 7 is a cross-sectional view illustrating a state of which the display device of FIG. 6 is bent.

Figure 7:
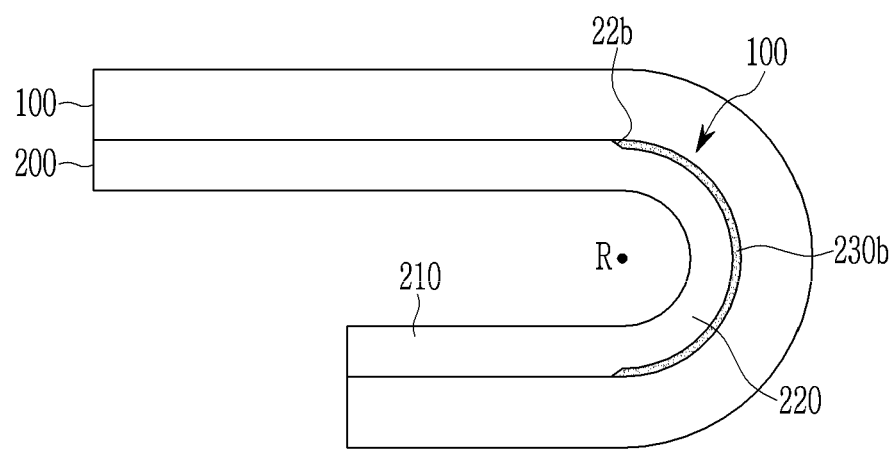
FIG. 7 is a cross-sectional view illustrating a state of which the display device of FIG. 6 is bent.

Referring to FIG. 6 and FIG. 7, the display device according to the illustrated exemplary embodiment is substantially similar to the display device described above with reference to FIG. 1 and FIG. 2. As such, repeated descriptions of substantially similar constituent elements will be omitted to avoid redundancy.

The display device according to the illustrated exemplary embodiment includes a display panel 100 and a support film 200 disposed below the display panel 100. The display device includes the bending region BA, and the support film 200 is disposed on a surface adjacent to the display panel 100. The support film 200 includes a second groove 22b formed in the second region 220 overlapping the bending region BA, and a third reinforcing layer 230b is formed in the second groove 22b.

Unlike the exemplary embodiments described above, the support film 200 of the display device according to the illustrated exemplary embodiment includes the second groove 22b formed at one surface thereof, and the third reinforcing layer 230b is formed in the second groove 22b.

The support film 200 may be a plastic or a thin metal film, and the third reinforcing layer 230b may be a polymer or a metal thin film. The third reinforcing layer 230b may include metal different from that of the support film 200.

Referring to FIG. 7, the display device 1000 is bent to have a center R of a curvature radius closer to the support film 200 than the display panel 100. The support film 200 includes the third reinforcing layer 230b overlapping the bending region BA, and the third reinforcing layer 230b is disposed at one surface of the support film 200. The third reinforcing layer 230b is disposed on a surface of the support film 200 that is relatively disposed far from the center of the curvature radius R among both surfaces thereof. The third reinforcing layer 230b is disposed to be adjacent to the display panel 100.

Since the support film 200 is disposed at a position overlapping the bending region BA, and includes the second region 220 with a relatively thin thickness, the support film 200 may be easily bent in the bending region BA. In addition, the support film 200 includes the third reinforcing layer 230*b* formed in the second region 220, which may reinforce the support film 200 to prevent the support film 200 from being damaged when the support film 200 is bent.

Figure 8:
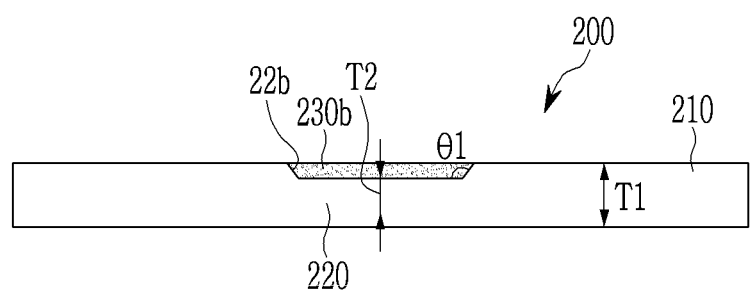
FIG. 8 is a cross-sectional view of a support film of the display device of FIG. 6 according to an exemplary embodiment.

Hereinafter, a support film of a display device according to an exemplary embodiment will be described in detail with reference to FIG. 8. FIG. 8 is a cross-sectional view of a support film of the display device of FIG. 6 according to another exemplary embodiment.

Referring to FIG. 8, the support film 200 includes the first region 210 having a relatively large first thickness T1, and the second region 220 having a relatively small second thickness T2. The second thickness T2 may be about ½ to about ⅔ of the first thickness T1. By forming the second thickness T2 of the second region 220 of the support film 200 to be about ½ to about ⅔ of the first thickness T1 of the support film 200, the bending process in the bending region may be easily performed, and the support film 200 may be prevented from being damaged when bent.

The second groove 22*b* is formed in the second region 220. As such, the second thickness T2 of the second region 220 is less than the first thickness T1 of the first region 210, in which a groove is not formed, because the second groove 22*b* is formed in the second region 220.

The second groove 22*b* may be formed on the entire surface of the second region 220 of the support film 200. The second groove 22*b* may be formed on either one of both surfaces of the support film 200, or may be formed on one surface closer to the display panel 100.

The second groove 22*b* has a lateral surface forming a first angle θ1 with respect to the bottom surface thereof, and the first angle θ1 may be an obtuse angle. For example, the first angle θ1 may be about 135 degrees. Since the first angle θ1 has an obtuse angle, the second groove 22*b* may have a substantially trapezoidal shape, such that its width increases from the bottom surface toward a top surface thereof.

The third reinforcing layer 230*b* is disposed in the second groove 22*b*. As shown in FIG. 8, the third reinforcing layer 230*b* according to an exemplary embodiment is formed to fill the second groove 22*b*, thus the surfaces of the support film 200 and the third reinforcing layer 230*b* may be substantially flat. More specifically the surface of the support film 200 and the surface of the third reinforcing layer 230*b* have substantially same heights with each other so the surface of the support film 200 and the surface of the third reinforcing layer 230*b* have no step difference. As such, since the upper surface of the support film 200 and the upper surface of the reinforcing layer 230*b* formed in the groove 22*b* of the support film 200 have substantially same heights with each other and the upper surface of the support film 200 and the upper surface of the reinforcing layer 230*b* have no step difference, a step that is induced by the difference between the support film 200 and the reinforcing layer 230*b* may not be visually recognized from the outside.

The support film 200 may be a plastic or a thin metal film, and the third reinforcing layer 230*b* may include a polymer, and may include a metal layer different from that of the support film 200. The third reinforcing layer 230*b* may be formed by coating or plating a polymer or metal.

As described above with reference to FIG. 6, the second width W2 of the second region 220, in which the third reinforcing layer 230*b* is formed, is greater than the first width W1 of the bending region BA of the display device 1000. By forming the second width W2 of the second region 220 greater than the first width W1 of the bending region BA of the display device 1000, the bending process in the bending region BA may be easily performed.

As such, in the display device and the support film according to an exemplary embodiment, since the groove 22*b* is formed in the second region 220 of the support film 200 overlapping the bending region BA of the display device to reduce the thickness of the support film 200, the reduced stress applied to the support film 200 may cause the support film 200 to be easily bent. In addition, since the reinforcing layer 230*b* is formed in the groove 22*b* to protect the support film 200, the support film 200 is prevented from being damaged when bent, and the support film 200 may firmly support the display panel.

Figure 9:
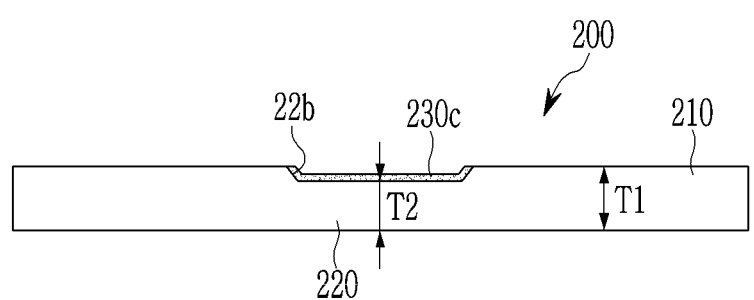
FIG. 9 is a cross-sectional view of a support film of the display device of FIG. 6 according to another exemplary embodiment.

Hereinafter, a support film of a display device according to another exemplary embodiment will be described with reference to FIG. 9. FIG. 9 is a cross-sectional view of a support film of the display device of FIG. 6 according to another exemplary embodiment.

Referring to FIG. 9, similarly to the exemplary embodiments described above, the support film 200 of the display device according to the illustrated exemplary embodiment is provided with the second groove 22*b* overlapping the bending region BA of the display device, and has a greater width than the bending region BA. A fourth reinforcing layer 230*c* is formed in the second groove 22*b*.

A thickness of the fourth reinforcing layer 230*c* is less than a height (or depth) of the second groove 22*b*. The fourth reinforcing layer 230*c* may be formed by plating a metal layer.

As such, in the display device and the support film according to the illustrated exemplary embodiment, since the groove 22*b* is formed in the second region 220 of the support film 200 overlapping the bending region BA of the display device to reduce the thickness of the support film 200, the reduced stress applied to the support film 200 may cause the support film 200 to be easily bent. In addition, by forming the reinforcing layer 230*b* in the groove 22*b* to protect the support film 200, the support film 200 may be prevented from being damaged when bent, and the support film 200 may firmly support the display panel.

Most of the features of the support film 200 according to the exemplary embodiments described above with reference to FIG. 6 to FIG. 8 are applicable to the support film 200 according to the illustrated exemplary embodiment.

Figure 10:
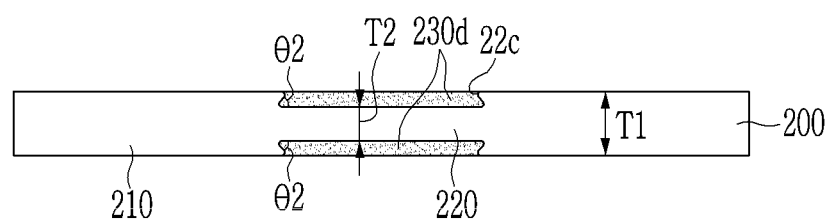
FIG. 10 is a cross-sectional view of a support film of a display device according to another exemplary embodiment.

Hereinafter, a support film of a display device according to another exemplary embodiment will be described with reference to FIG. 10. FIG. 10 is a cross-sectional view of a support film of a display device according to another exemplary embodiment.

Referring to FIG. 10, the support film 200 of the display device according to the illustrated exemplary embodiment includes the first region 210 having a relatively large first thickness T1, and the second region 220 having a relatively small second thickness T2. The second thickness T2 may be about ½ to about ⅔ of the first thickness T1. By forming the second thickness T2 of the second region 220 of the support film 200 to be about ½ to about ⅔ of the first thickness T1 of the support film 200, the bending process in the bending region may be easily performed, and the support film 200 may be prevented from being damaged when bent.

The support film 200 of the display device according to the illustrated exemplary embodiment includes a third groove 22*c* overlapping the bending region BA. The third groove 22*c* has a bottom surface and a lateral surface forming a second angle θ2 with respect to the bottom surface. The second angle θ2 may be an acute angle and may be, for example, about 45 degrees or less. As such, the third groove 22c includes a lateral surface forming the second angle θ2 (which is an acute angle) with respect to the bottom surface, thus a width of the third groove 22c may be decreased from the bottom surface toward the top surface thereof.

A fifth reinforcing layer 230d is formed in the third groove 22c of the support film 200. The fifth reinforcing layer 230d is formed to fill the third groove 22c, thus surfaces of the support film 200 and the fifth reinforcing layer 230d may be substantially flat. More specifically the surface of the support film 200 and the surface of the fifth reinforcing layer 230d have substantially same heights with each other so the surface of the support film 200 and the surface of the fifth reinforcing layer 230d have no step difference. As such, since the upper surface of the support film 200 and the upper surface of the fifth reinforcing layer 230d formed in the third groove 22c of the support film 200 have substantially same heights with each other and the upper surface of the support film 200 and the upper surface of the fifth reinforcing layer 230d have no step difference, a step that is induced by the difference between the support film 200 and the fifth reinforcing layer 230d may not be visually recognized from the outside.

The support film 200 may be a plastic or a thin metal film, and the fifth reinforcing layer 230d may include a polymer, or may include a metal layer different from that of the support film 200. The fifth reinforcing layer 230d may be formed by coating or plating a polymer or metal.

As described above with reference to FIG. 1, the second width W2 of the second region 220, in which the fifth reinforcing layer 230d is formed, is greater than the first width W1 of the bending region BA of the display device 1000. By forming the second width W2 of the second region 220 greater than the first width W1 of the bending region BA of the display device 1000, the bending process in the bending region BA may be easily performed.

As such, in the display device and the support film of the illustrated exemplary embodiment, since the groove 22c is formed in the second region 220 of the support film 200 overlapping the bending region BA of the display device to reduce the thickness of the support film 200, the reduced stress applied to the support film 200 may cause the support film 200 to be easily bent. In addition, by forming the reinforcing layer 230d in the groove 22c to protect the support film 200, the support film 200 is prevented from being damaged when bent, and the support film 200 may firmly support the display panel.

Most of the features of the display devices and the support films according to the exemplary embodiments described above with reference to FIG. 1 to FIG. 4 are applicable to the support film 200 according to the illustrated exemplary embodiment.

Figure 11:
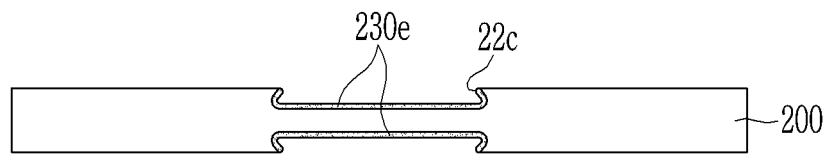
FIG. 11 is a cross-sectional view of a support film of a display device according to another exemplary embodiment.

Hereinafter, a support film of a display device according to another exemplary embodiment will be described with reference to FIG. 11. FIG. 11 is a cross-sectional view of a support film of a display device according to another exemplary embodiment.

Referring to FIG. 11, similarly to the exemplary embodiments described above, the support film 200 of the display device according to the illustrated exemplary embodiment includes a third groove 22c overlapping the bending region BA of the display device, and has a greater width than the bending region BA. A sixth reinforcing layer 230e is formed in the third groove 22c.

A thickness of the sixth reinforcing layer 230e is less than a height (or depth) of the third groove 22c. The sixth reinforcing layer 230e may be formed by plating a metal layer.

As such, in the display device and the support film 200 of the illustrated exemplary embodiment, since the groove 22c is formed in the second region 220 of the support film 200 overlapping the bending region BA of the display device to reduce the thickness of the support film 200, the reduced stress applied to the support film 200 may cause the support film 200 to be easily bent. In addition, by forming the reinforcing layer 230e in the groove 22c to protect the support film 200, the support film 200 is prevented from being damaged when bent, and the support film 200 may firmly support the display panel.

Most of the features of the display devices and the support films described above with reference to FIG. 1 to FIG. 4 are applicable to the support film according to the illustrated exemplary embodiment.

Figure 12:
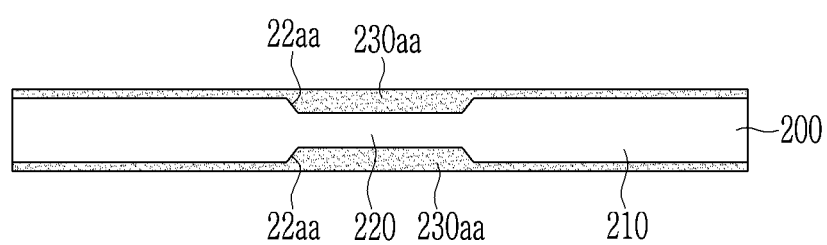
FIG. 12 is a cross-sectional view of a support film of a display device according to another exemplary embodiment.

Hereinafter, a support film of a display device according to another exemplary embodiment will be described with reference to FIG. 12. FIG. 12 is a cross-sectional view of a support film of a display device according to another exemplary embodiment.

Referring to FIG. 12, similarly to the exemplary embodiments described above, the support film 200 of the display device according to the illustrated exemplary embodiment includes a fourth groove 22aa overlapping the bending region BA of the display device, and has a greater width than the bending region BA. A seventh reinforcing layer 230aa is formed on an entire surface of the fourth groove 22aa and the support film 200.

As such, the support film 200 of the display device according to the illustrated exemplary embodiment includes the seventh reinforcing layer 230aa formed on the entire surface of the support film 200, as well as in the fourth groove 22aa. Since the support film 200 overlaps the bending region BA and includes the second region 220 having a relatively small thickness, the display device may be easily bent. In addition, the seventh reinforcing layer 230aa is formed on the entire surface of the support film 200 to reinforce the support film 200, and thus, the support film 200 may be protected from damages that may occur when display device is bent.

Most of the features of the display devices and the support films according to the exemplary embodiments described above with reference to FIG. 1 to FIG. 4 are applicable to the support film according to the illustrated exemplary embodiment.

Figure 13:
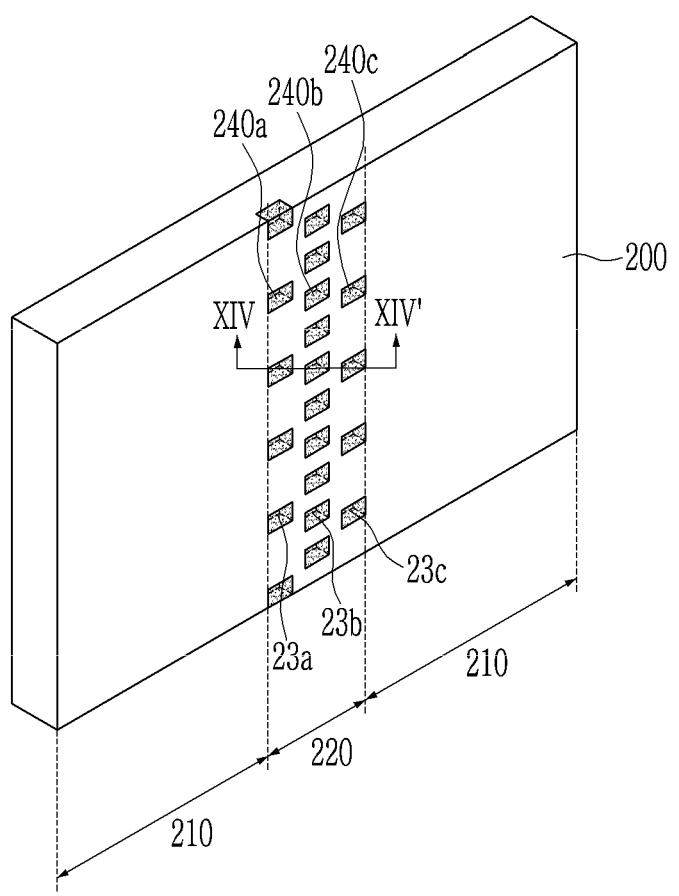
FIG. 13 is a perspective view of a support film of a display device according to another exemplary embodiment.

Hereinafter, a support film of a display device according to another exemplary embodiment will be described with reference to FIG. 13 and FIG. 14. FIG. 13 is a perspective view of a support film of a display device according to another exemplary embodiment, and FIG. 14 is a cross-sectional view taken along line XIV-XIV' of a display device of FIG. 13.

Figure 14:
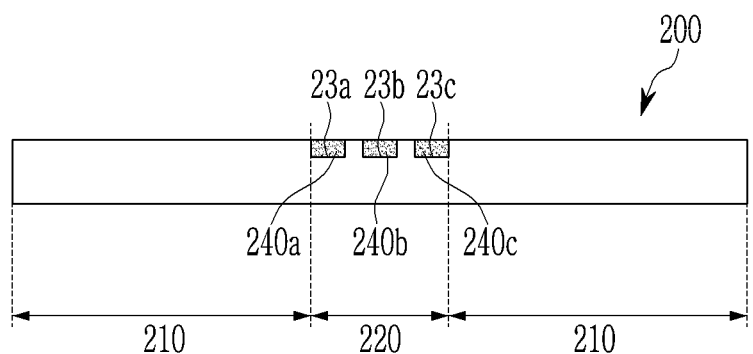
FIG. 14 is a cross-sectional view taken along line XIV-XIV' of a display device of FIG. 13.

Referring to FIG. 13 and FIG. 14, the support film 200 of the display device according to the illustrated exemplary embodiment is provided with a plurality of grooves 23a, 23b, and 23c formed in the second region 220 corresponding to the bending region BA. The plurality of grooves 23a, 23b, and 23c include a fifth groove 23a, a sixth groove 23b, and a seventh groove 23c, which are spaced apart from each other. The sixth groove 23b is disposed at a central portion of the second region 220, and the fifth groove 23a and the seventh groove 23c are disposed at opposite sides of the sixth groove 23b. A number of sixth grooves 23b may be greater than a number of fifth grooves 23a and a number of seventh grooves 23c. As such, a larger number of sixth grooves 23b are formed at the central portion of the second region 220 corresponding to the bending region BA, which may reduce stress on the central portion of the bending region BA, thereby causing the bending process to be easily performed.

Due to the plurality of grooves 23a, 23b, and 23c, an average thickness of the second region 220 of the support film 200 is less than a thickness of the remaining region of the support film 200.

A plurality of reinforcing layers 240a, 240b, and 240c are formed in the plurality of grooves 23a, 23b, and 23c, respectively. By forming the plurality of reinforcing layers 240a, 240b, and 240c in the plurality of grooves 23a, 23b, and 23c, the damage to the display device from bending the second region 220 corresponding to the bending region BA may be prevented.

According to the illustrated exemplary embodiment, the thicknesses of the plurality of reinforcing layers 240a, 240b, and 240c formed in the plurality of grooves 23a, 23b, and 23c are substantially the same as heights (or depth) of the plurality of grooves 23a, 23b, and 23c, and thus, surfaces of the support film 200 and the plurality of reinforcing layers 240a, 240b, and 240c are substantially flat. More specifically, the surface of the support film 200 and the surfaces of and the plurality of reinforcing layers 240a, 240b, and 240c have substantially same heights with each other so the surface of the support film 200 and the surfaces of and the plurality of reinforcing layers 240a, 240b, and 240c have no step difference. As such, since the upper surface of the support film 200 and the upper surfaces of the plurality of reinforcing layers 240a, 240b, and 240c formed in the plurality of grooves 23a, 23b, and 23c of the support film 200 have substantially same heights with each other and the upper surface of the support film 200 and the upper surfaces of the plurality of reinforcing layers 240a, 240b, and 240c have no step difference, a step that is induced by the difference between the support film 200 and the plurality of reinforcing layers 240a, 240b, and 240c may not be visually recognized from the outside.

According to an exemplary embodiment, the thicknesses of the plurality of reinforcing layers 240a, 240b, and 240c may be less than the heights (or depths) of the plurality of grooves 23a, 23b, and 23c.

Since the support film 200 includes the plurality of grooves 23a, 23b, and 23c and the plurality of reinforcing layers 240a, 240b, and 240c formed in the second region 220 corresponding to the bending region BA, the average thickness of the support film 200 corresponding to the bending region BA may be reduced to reduce the stress applied thereto during bending, which may cause the bending to be easily performed, as well as preventing the support film 200 from being damaged when bent.

Unlike the support films of the display devices according to the exemplary embodiments described above, the support film 200 of the display device according to the illustrated exemplary embodiment includes the plurality of grooves 23a, 23b, and 23c formed in the second region 220 with a relatively small thickness, and the plurality of reinforcing layers 240a, 240b, and 240c formed in the plurality of grooves 23a, 23b, and 23c, respectively. As such, as compared to when the grooves and the reinforcing layers are formed on the entire surface of the second region 220 of the support film 200, since the support film 200 of the display device includes the plurality of grooves 23a, 23b, and 23c and the plurality of reinforcing layers 240a, 240b, and 240c, a position of the second region 220 may be prevented from being visually recognized from the outside due to a thickness difference of the support film 200.

FIGS. 13 and 14 show that the plurality of grooves 23a, 23b, and 23c and the plurality of reinforcing layers 240a, 240b, and 240c are formed in only one surface of the support film 200, however, the inventive concepts are not limited thereto. For example, the plurality of grooves 23a, 23b, and 23c and the plurality of reinforcing layers 240a, 240b, and 240c may be formed in both surfaces of the support film 200.

Except for the plurality of grooves and the plurality of reinforcing layers, most of the features of the support films of the display devices according to the exemplary embodiments described above are applicable to the support film of the display device according to the illustrated exemplary embodiment.

Figure 15:
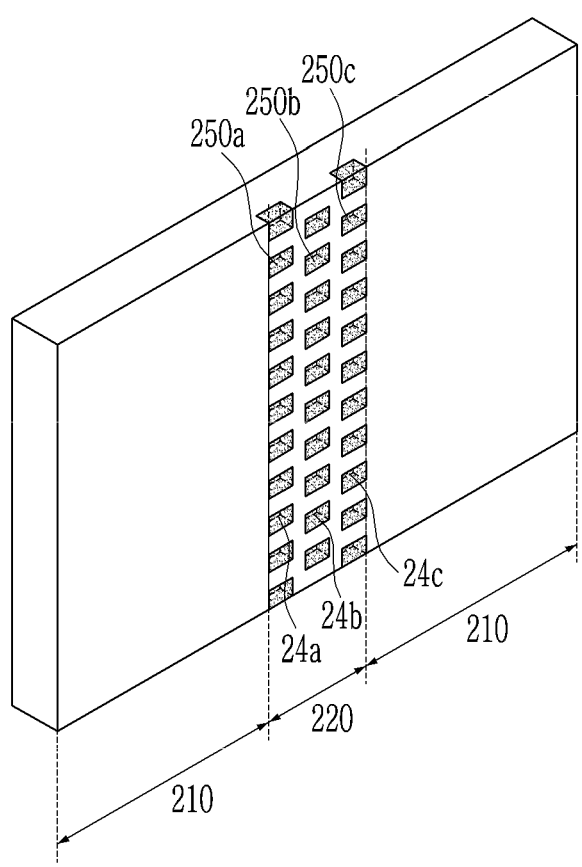
FIG. 15 is a perspective view of a support film of a display device according to another exemplary embodiment.

Hereinafter, a support film of a display device according to another exemplary embodiment will be described with reference to FIG. 15. FIG. 15 is a perspective view of a support film of a display device according to another exemplary embodiment.

Referring to FIG. 15, the support film of the display device according to the illustrated exemplary embodiment is similar to the support film of the display device shown in FIG. 13 and FIG. 14.

Referring to FIG. 15, the support film 200 of the display device according to the illustrated exemplary embodiment is provided with a plurality of grooves 24a, 24b, and 24c formed in the second region 220 corresponding to the bending region BA. The plurality of grooves 24a, 24b, and 24c include an eighth groove 24a, a ninth groove 24b, and a tenth groove 24c, which are spaced apart from each other. The eighth groove 24a, the ninth groove 24b, and the tenth groove 24c are spaced apart from each other, and numbers of the eighth groove 24a, the ninth groove 24b, and the tenth groove 24c may be substantially the same.

Due to the plurality of grooves 24a, 24b, and 24c, an average thickness of the second region 220 of the support film 200, in which the plurality of grooves 24a, 24b, and 24c are formed, is less than a thickness of the remaining region of the support film 200.

A plurality of reinforcing layers 250a, 250b, and 250c are formed in the plurality of grooves 24a, 24b, and 24c, respectively. By forming the plurality of reinforcing layers 250a, 250b, and 250c in the plurality of grooves 24a, 24b, and 24c, the damage to the display device from bending the bending of the second region 220 corresponding to the bending region BA of may be prevented.

Thicknesses of the plurality of reinforcing layers 250a, 250b, and 250c formed in the plurality of grooves 24a, 24b, and 24c are substantially the same as heights (or depths) of the plurality of grooves 24a, 24b, and 24c, and thus, surfaces of the support film 200 and the plurality of reinforcing layers 250a, 250b, and 250c may be substantially flat. More specifically the surface of the support film 200 and the surfaces the plurality of reinforcing layers 250a, 250b, and 250c have substantially same heights with each other so the surface of the support film 200 and the surfaces of the plurality of reinforcing layers 250a, 250b, and 250c have no step difference. As such, since the upper surface of the support film 200 and the upper surfaces of the plurality of reinforcing layers 250a, 250b, and 250c formed in the plurality of grooves 24a, 24b, and 24c of the support film 200 have substantially same heights with each other and the upper surface of the support film 200 and the upper surfaces of the plurality of reinforcing layers 250a, 250b, and 250c have no step difference, a step that is induced by the difference between the support film 200 and the plurality of reinforcing layers 250a, 250b, and 250c may not be visually recognized from the outside.

According to an exemplary embodiment, the thicknesses of the plurality of reinforcing layers 250a, 250b, and 250c may be less than the heights (or depths) of the plurality of grooves 24a, 24b, and 24c.

Since the support film 200 includes the plurality of grooves 24a, 24b, and 24c, and the plurality of reinforcing layers 250a, 250b, and 250c formed in the second region 220 corresponding to the bending region BA, the average thickness of the support film 200 corresponding to the bending region BA may be reduced to reduce the stress applied thereto when bent. As such, it is possible to easily perform the bending process, as well as preventing the support film 200 from being damaged when bent.

Unlike the support films of the display devices according to the exemplary embodiments described above, the support film of the display device according to the illustrated exemplary embodiment includes the plurality of grooves 24a, 24b, and 24c formed in the second region 220 with a relatively small thickness, and the plurality of reinforcing layers 250a, 250b, and 250c formed in the plurality of grooves 24a, 24b, and 24c.

As such, as compared to when the grooves and the reinforcing layers are formed on the entire surface of the second region 220 of the support film 200, since the support film 200 of the display device according to the illustrated exemplary embodiment includes the plurality of grooves 24a, 24b, and 24c and the plurality of reinforcing layers 250a, 250b, and 250c, a position of the second region 220 may be prevented from being visually recognized from the outside due to a thickness difference of the support film 200.

FIG. 15 shows that the plurality of grooves 24a, 24b, and 24c and the plurality of reinforcing layers 250a, 250b, and 250c are formed in only one surface of the support film 200, however, the inventive concepts are not limited thereto. For example, the plurality of grooves 24a, 24b, and 24c and the plurality of reinforcing layers 250a, 250b, and 250c may be formed in both surfaces of the support film 200.

Except for the grooves and the reinforcing layers, most of the features of the support films of the display devices according to the exemplary embodiments described above are applicable to the support film 200 of the display device according to the illustrated exemplary embodiment.

Figure 16:
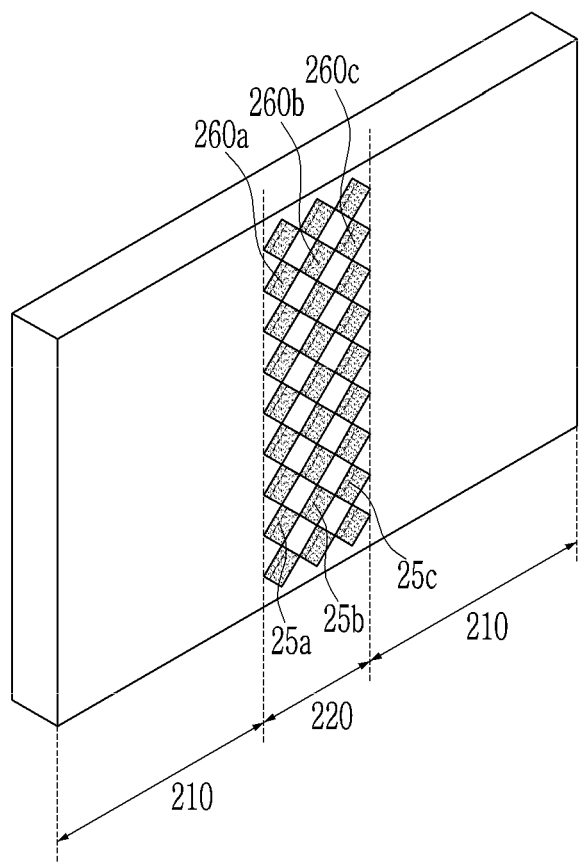
FIG. 16 is a perspective view of a support film of a display device according to another exemplary embodiment.

Hereinafter, a support film of a display device according to another exemplary embodiment will be described with reference to FIG. 16. FIG. 16 is a perspective view of a support film of a display device according to another exemplary embodiment.

Referring to FIG. 16, the support film of the display device according to the illustrated exemplary embodiment is similar to the support films of the display devices shown in FIG. 13 and FIG. 14 or in FIG. 15.

The support film 200 of the display device according to the illustrated exemplary embodiment is provided with a plurality of grooves 25a, 25b, and 25c formed in the second region 220 corresponding to the bending region BA. The plurality of grooves 25a, 25b, and 25c include an eleventh groove 25a, a twelfth groove 25b, and a thirteenth groove 25c, which are adjacent to each other. The eleventh groove 25a, the twelfth groove 25b, and the thirteenth groove 25c may have a rhomboidal shape, and may be substantially uniformly formed over the entire surface of the second region 220 of the support film 200.

Due to the plurality of grooves 25a, 25b, and 25c, an average thickness of the second region 220 of the support film 200, in which the plurality of grooves 25a, 25b, and 25c are formed, is less than a thickness of the remaining region of the support film 200.

A plurality of reinforcing layers 260a, 260b, and 260c are formed in the plurality of grooves 25a, 25b, and 25c, respectively. By forming the plurality of reinforcing layers 260a, 260b, and 260c in the plurality of grooves 25a, 25b, and 25c, the damage to display device may be prevented when the second region 220 corresponding to the bending region BA is bent.

Thicknesses of the plurality of reinforcing layers 260a, 260b, and 260c formed in the plurality of grooves 25a, 25b, and 25c are substantially the same as heights (or depths) of the plurality of grooves 25a, 25b, and 25c, and surfaces of the support film 200 and the plurality of reinforcing layers 260a, 260b, and 260c may be substantially flat. More specifically the surface of the support film 200 and the surfaces the plurality of reinforcing layers 260a, 260b, and 260c have substantially same heights with each other so the surface of the support film 200 and the surfaces of the plurality of reinforcing layers 260a, 260b, and 260c have no step difference. As such, since the upper surface of the support film 200 and the upper surfaces of the plurality of reinforcing layers 260a, 260b, and 260c formed in the plurality of grooves 25a, 25b, and 25c of the support film 200 have substantially same heights with each other and the upper surface of the support film 200 and the upper surfaces of the plurality of reinforcing layers 260a, 260b, and 260c have no step difference, a step that is induced by the difference between the support film 200 and the plurality of reinforcing layers 260a, 260b, and 260c may not be visually recognized from the outside.

According to an exemplary embodiment, the thicknesses of the plurality of reinforcing layers 260a, 260b, and 260c may be less than the heights of the plurality of grooves 25a, 25b, and 25c.

Since the support film 200 includes the plurality of grooves 25a, 25b, and 25c and the plurality of reinforcing layers 260a, 260b, and 260c formed in the second region 220 corresponding to the bending region BA, the average thickness of the support film 200 corresponding to the bending region BA may be reduced to reduce the stress applied thereto when bent. As such, it is possible to easily perform the bending, as well as preventing the support film 200 from being damaged when bent.

Unlike the support films of the display devices according to the exemplary embodiments described above, the support film 200 of the display device according to the illustrated exemplary embodiment includes the plurality of grooves 25a, 25b, and 25c formed in the second region 220 with a relatively small thickness, and the plurality of reinforcing layers 260a, 260b, and 260c formed in the plurality of grooves 25a, 25b, and 25c.

As such, as compared to when the grooves and the reinforcing layers are formed on the entire surface of the second region 220 of the support film 200, since the support film 200 of the display device according to the illustrated exemplary embodiment includes the plurality of grooves 25a, 25b, and 25c and the plurality of reinforcing layers 260a, 260b, and 260c, a position of the second region 220 may be prevented from being visually recognized from the outside due to a thickness difference of the support film 200.

FIG. 16 shows that the plurality of grooves 25a, 25b, and 25c and the plurality of reinforcing layers 260a, 260b, and 260c are formed in only one surface of the support film 200, however, the inventive concepts are not limited thereto. For example, the plurality of grooves 25a, 25b, and 25c and the plurality of reinforcing layers 260*a*, 260*b*, and 260*c* may be formed in both surfaces of the support film 200.

Except for the grooves and the reinforcing layers, most of the features of the support films of the display devices according to the exemplary embodiments described above are applicable to the support film 200 of the display device according to the illustrated exemplary embodiment.

Figure 17:
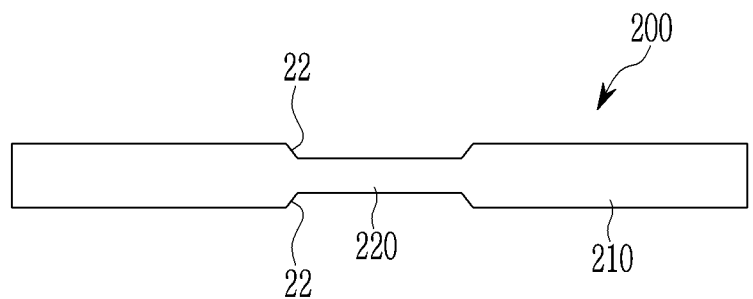
FIG. 17, FIG. 18, and FIG. 19 are schematic views for explaining a manufacturing method of a support film of a display device according to an exemplary embodiment.
Figure 18:
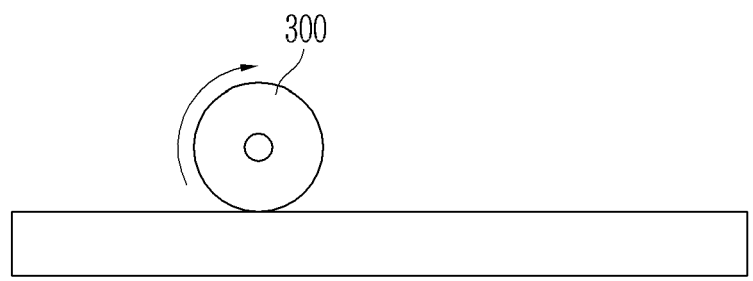
Figure 19:
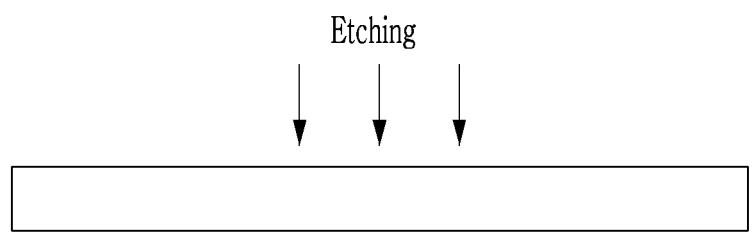

Hereinafter, a manufacturing method of a support film of a display device according to an exemplary embodiment will be described with reference to FIG. 17 to FIG. 19 together with FIG. 3. FIG. 17 to FIG. 19 are schematic views for explaining a manufacturing method of a support film of a display device according to an exemplary embodiment.

Referring to FIG. 17, the groove 22 is formed in the second region 220 of the support film 200, such that the thickness in the second region 220 of the support film 200 becomes less than the thickness of the first region 210 of the support film 200.

More particularly, the thickness of the second region 220 of the support film 200 may be reduced by pressing the support film 200 using a roller 300, as shown in FIG. 18. Alternatively, the groove 22 may be formed in the second region 220 of the support film 200 by etching the surface of the support film 200, as shown in FIG. 19.

When the groove 22 is formed in the second region 220 of the support film 200, the reinforcing layer 230 may be formed in the groove 22 as shown in FIG. 3. The reinforcing layer 230 may be formed by stacking or plating polymer or metal thin films.

As such, after the groove 22 and the reinforcing layer 230 are formed in the support film 200, as shown in FIG. 1, the support film 200 provided with the groove 22 and the reinforcing layer 230 is attached to the display panel 100.

According to the manufacturing method of the display device and the support film of the illustrated exemplary embodiment, the groove 22 is formed in the second region 220 of the support film 200 overlapping the bending region BA of the display device to reduce the thickness of the support film 200. In this manner the stress applied to the support film 200 may be reduced to be easily bent. In addition, by forming the reinforcing layer in the groove 22 to protect the support film 200, the support film 200 may be prevented from being damaged when bent, and the support film 200 may firmly support the display panel.

According to the exemplary embodiments of the present invention, a display device may be easily bent, and the supporting film may support a bending region of the display device so that a display panel to prevent damages when bent.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A support film for a display device to support a display panel of the display device, comprising:
   a first region having a first thickness and a second region having a second thickness less than the first thickness;
   a groove formed in the second region; and
   a reinforcing layer formed in the groove,
   wherein:
   the reinforcing layer is disposed in the second region without overlapping the first region;
   at least one of the support film and the reinforcing layer comprises metal; and
   the groove and the reinforcing layer are disposed on each of opposing surfaces of the support film.

2. The support film of claim 1, wherein surfaces of the support film and the reinforcing layer are substantially flat.

3. The support film of claim 1, wherein:
   the support film comprises a plastic or the reinforcing layer comprises a polymer.

4. The support film of claim 1, wherein:
   a plurality of the grooves is formed in the second region; and
   the reinforcing layer is disposed in each of the grooves.

5. The support film of claim 1, wherein the second thickness is about ½ to ⅔ of the first thickness.

6. The support film of claim 1, wherein:
   the groove has a bottom surface and a lateral surface connected to the bottom surface; and
   an angle between the bottom surface and the lateral surface is an obtuse angle.

7. The support film of claim 1, wherein:
   the groove has a bottom surface and a lateral surface connected to the bottom surface; and
   an angle between the bottom surface and the lateral surface is an acute angle.

8. A display device comprising:
   a display panel comprising a bending region; and
   a support film overlapping the display panel,
   wherein:
   the support film comprises a first region having a first thickness and a second region having a second thickness less than the first thickness;
   the second region overlaps the bending region;
   the support film has a groove formed in the second region; and
   a reinforcing layer disposed in the groove,
   wherein:
   the reinforcing layer is disposed in the second region without overlapping the first region;
   at least one of the support film and the reinforcing layer comprises metal; and
   the groove and the reinforcing layer are disposed on each of opposing surfaces of the support film.

9. The display device of claim 8, wherein surfaces of the support film and the reinforcing layer are substantially flat.

10. The display device of claim 8, wherein:
    the support film comprises a plastic or the reinforcing layer comprises a polymer.

11. The display device of claim 8, wherein:
    a plurality of the grooves is formed in the second region; and
    the reinforcing layer is disposed in each of the grooves.

12. The display device of claim 8, wherein a width of the second region is greater than a width of the bending region.

13. The display device of claim 8, wherein the second thickness is about ½ to ⅔ of the first thickness.

14. The display device of claim 11, wherein:
    the second region has a middle portion and side portions interposing the middle portion; and
    a number of the grooves formed in the middle portion is greater than a number of the grooves formed in one of the side portions.

15. The display device of claim 11, wherein:
    the second region has a middle portion and side portions interposing the middle portion; and
    a number of the grooves formed in each portion is substantially the same with each other.

16. A manufacturing method of a display device, comprising:
- forming a groove in a first region of a support film;
- forming a reinforcing layer in the groove; and
- attaching the support film to a display panel,
- wherein the first region of the support film has a thickness less than remaining areas of the support film not disposed with the groove,
- wherein the reinforcing layer is disposed in the second region without overlapping the remaining areas,
- wherein at least one of the support film and the reinforcing layer comprises metal, and
- wherein the groove and the reinforcing layer are disposed on each of opposing surfaces of the support film.

17. The manufacturing method of claim 16, wherein the groove is formed by a pressing process using a roller.

18. The manufacturing method of claim 16, wherein the groove is formed by etching the support film.

19. The manufacturing method of claim 16, wherein the reinforcing layer is formed by stacking polymer or metal materials.

20. The manufacturing method of the display device of claim 16, wherein forming the reinforcing layer is performed by plating a metal material.

* * * * *